United States Patent
Yue et al.

(10) Patent No.: US 12,021,206 B2
(45) Date of Patent: Jun. 25, 2024

(54) METHOD FOR RECYCLING WASTE LITHIUM IRON PHOSPHATE BY SELECTIVE OXIDATION-REDUCTION, RECYCLED LITHIUM IRON PHOSPHATE, AND LITHIUM ION BATTERY

(71) Applicant: LIYUAN (SHENZHEN) SCIENTIFIC RESEARCH CO., LTD., Guangdong (CN)

(72) Inventors: Haifeng Yue, Guangdong (CN); Xueqin He, Guangdong (CN); Youyuan Huang, Guangdong (CN); Caide Yang, Guangdong (CN); Shunyi Yang, Guangdong (CN); Xiaobing Xi, Guangdong (CN)

(73) Assignee: LIYUAN (SHENZHEN) SCIENTIFIC RESEARCH CO., LTD., Guangdong (CN)

( * ) Notice: Subject to any disclaimer, the term of this patent is extended or adjusted under 35 U.S.C. 154(b) by 621 days.

(21) Appl. No.: 17/286,438

(22) PCT Filed: Sep. 2, 2020

(86) PCT No.: PCT/CN2020/112973
§ 371 (c)(1),
(2) Date: Apr. 16, 2021

(87) PCT Pub. No.: WO2021/114747
PCT Pub. Date: Jun. 17, 2021

(65) Prior Publication Data
US 2022/0102773 A1    Mar. 31, 2022

(30) Foreign Application Priority Data
Dec. 9, 2019  (CN) .......................... 201911251921.4

(51) Int. Cl.
H01M 10/54    (2006.01)
H01M 4/136    (2010.01)
H01M 4/58     (2010.01)

(52) U.S. Cl.
CPC ........... H01M 10/54 (2013.01); H01M 4/136 (2013.01); H01M 4/5825 (2013.01); *Y02W 30/84* (2015.05)

(58) Field of Classification Search
CPC .......................... H01M 10/54; H01M 4/5825
See application file for complete search history.

(56) References Cited

FOREIGN PATENT DOCUMENTS

| CN | 102208706 A | 10/2011 |
|---|---|---|
| CN | 102751548 A | 10/2012 |

(Continued)

OTHER PUBLICATIONS

Machine Translation of CN-106684485-A (Dec. 12, 2023) (Year: 2023).*

(Continued)

*Primary Examiner* — Matthew J Merkling
(74) *Attorney, Agent, or Firm* — Merchant & Gould P.C.

(57) ABSTRACT

A method for recycling waste lithium iron phosphate is by selective oxidation-reduction, to obtain recycled lithium iron phosphate, and a lithium ion battery. The method includes: primarily sintering waste lithium iron phosphate under a condition where a mild oxidizing gas is introduced; separating a lithium iron phosphate powder material; supplementing lithium and supplementing carbon to the lithium iron phosphate powder material and regulating the composition of the lithium iron phosphate powder material using a lithium source and a carbon source by secondary sintering to obtain recycled lithium iron phosphate, wherein the mild oxidizing gas is water vapor, CO2 gas, or a mixed gas thereof.

20 Claims, 3 Drawing Sheets

Primarily sintering waste lithium iron phosphate under a condition where a mild oxidizing gas is introduced, wherein the mild oxidizing gas is water vapor, $CO_2$ gas, or a mixed gas thereof — S100

Separating a lithium iron phosphate powder material from a material obtained by the primary sintering — S200

Supplementing lithium and supplementing carbon to the lithium iron phosphate powder material obtained by separating and regulating the composition of the lithium iron phosphate powder material obtained by separating using a lithium source and a carbon source by means of secondary sintering to obtain recycled lithium iron phosphate — S300

(56) References Cited

FOREIGN PATENT DOCUMENTS

| | | | | |
|---|---|---|---|---|
| CN | 105731411 A | * | 7/2016 | ............. B82Y 30/00 |
| CN | 105977569 A | * | 9/2016 | |
| CN | 106684485 A | * | 5/2017 | ............ H01M 10/54 |
| CN | 109167119 A | | 1/2019 | |
| CN | 109346789 A | | 2/2019 | |
| CN | 109652654 A | | 4/2019 | |
| CN | 110085937 A | | 8/2019 | |
| JP | 2005197149 A | | 7/2005 | |

OTHER PUBLICATIONS

Machine Translation of CN-105731411-A (Dec. 12, 2023) (Year: 2023).*
Machine Translation of CN-105977569-A (Dec. 12, 2023) (Year: 2023).*
PCT International Search Report for PCT Application No. PCCT/CN2020/112973 mailed Dec. 3, 2020 (3 pages).

* cited by examiner

METHOD FOR RECYCLING WASTE LITHIUM IRON PHOSPHATE BY SELECTIVE OXIDATION-REDUCTION, RECYCLED LITHIUM IRON PHOSPHATE, AND LITHIUM ION BATTERY

This application is a National Stage Application of PCT/CN2020/112973, filed 2 Sep. 2020, which claims benefit of Serial No. 201911251921.4, filed 9 Dec. 2019 in China and which applications are incorporated herein by reference. To the extent appropriate, a claim of priority is made to each of the above-disclosed applications.

TECHNICAL FIELD

The present disclosure relates to the field of positive electrode materials for lithium ion batteries, and relates to a method for recycling waste lithium iron phosphate by selective oxidation-reduction, recycled lithium iron phosphate, and a lithium ion battery.

BACKGROUND ART

Since 2019, China has gradually entered a stage of large-scale decommissioning of lithium iron phosphate batteries. In case of improper disposal, severe pollution will be caused, and new energy materials may be changed from "green" (or environmentally friendly) materials to "black" (or environmentally unfriendly) materials. $LiFePO_4$ has a relatively stable structure. The electrochemical performance of $LiFePO_4$ decommissioned after long cycles can be restored to a considerable extent by appropriate techniques such as supplementation of lithium and repairing of coating carbon. $LiFePO_4$ has high recyclable value. Recycled LFP has the characteristics such as low cost, long cycle performance, high thermal stability and sufficient supply and can be used in the field of energy storage on a large scale, although it does not have a high energy density.

At present, there have been a lot of researches and reports on the direct recycling of waste LFP. The main process procedures may be summarized as: dismantling batteries and sorting out electrode sheets→stripping waste LFP from the electrode sheets→regulating the composition and particle size→sintering and repairing.

Material stripping is the most important technical procedure. It is equivalent to extracting $LiFePO_4$ with higher purity from waste electrode sheets, from a macro perspective of composition regulation. Two key issues are involved here. The first issue is how to achieve a high stripping rate. The second issue is how to avoid the introduction of impurities or foreign matters such as Al powder in the separation and extraction process. In response to the above issues, relevant researchers have developed a dry heat treatment route and a wet immersion route, respectively. The dry heat treatment is developed based on different melting points of PVDF acting as a binder and aluminum foil. For example, when the temperature is maintained between 360° C. and 490° C., only PVDF is molten and pyrolyzed to lose the effect as a binder. After the temperature is lowered down, LFP can be stripped off by vibrational sieving or other means. The wet immersion is divided into two methods of dissolving aluminum foil in an inorganic alkaline solution and dissolving PVDF in an organic solvent. However, there are still several problems when the above methods are transferred from the laboratory to the pilot scale production. The more prominent problems are discussed below. In the pyrogenic route, aluminum foils of a small number of electrode sheets are powdered and burned because electrolytes are not fully cleaned, and aluminum powder is inevitably introduced as a foreign matter in the subsequent stripping process. For some compacted electrode sheets, material particles have been embedded in the aluminum foils and thus cannot be completely stripped off. Moreover, there is a common problem that residual carbon is generated from calcination of SP and PVDF added by homogenization, resulting in a significant excess amount of carbon in the recycled LFP. All of these cause problems in stripping rate and control of foreign matters during mass production. In the wet routes, the wet stripping route using an alkaline solution requires consumption of a large amount of an alkaline reagent and requires multiple washing operations for stripping of LFP, whereby a large amount of waste water is produced. In the research and report on the organic solvent method, the liquid-to-solid ratio is as high as 20:1, which leads to an excessively high cost in the organic solvent. If a distillation and reflux processes is added, the energy consumption cost is too high, and it is still difficult to achieve industrialization.

Therefore, it has become a difficult challenge in the art to develop a technology capable of fully deactivating the binder to achieve efficient stripping while being capable of selectively oxidizing and removing excess residual carbon to ultimately recycle waste LFP with a short procedure.

SUMMARY

On this basis, an object of the present disclosure is to provide a method for recycling waste lithium iron phosphate by selective oxidation-reduction, recycled lithium iron phosphate, and a lithium ion battery. The recycled lithium iron phosphate prepared by using the method has the characteristics of low cost, excellent cycle performance, high compacted density, etc.

A method for recycling waste lithium iron phosphate by selective oxidation-reduction includes steps of:
performing primary sintering on waste lithium iron phosphate under a condition where a mild oxidizing gas is introduced;
separating a lithium iron phosphate powder material from a material obtained by the primary sintering;
supplementing lithium and supplementing carbon to the lithium iron phosphate powder material and regulating the composition of the lithium iron phosphate powder material using a lithium source and a carbon source by means of secondary sintering, to obtain recycled lithium iron phosphate,
wherein the mild oxidizing gas is water vapor, $CO_2$ gas, or a mixed gas thereof.

In the present disclosure, waste $LiFePO_4$ (LFP) battery electrode sheets are used as raw materials and primarily sintered in a mild oxidizing gas such as water vapor, $CO_2$, or the like, so that a binder in the waste LFP is deactivated and at the same time the amorphous coating carbon is removed by selective oxidation. Thus, the residual coating carbon is graphitized to an increased to degree. Since graphitized carbon has high conductivity and can suppress the growth of crystal grains of LFP, waste LFP can be secondarily sintered at an increased temperature without causing excessive growth of the crystal grains. Therefore, recycled LFP with a suitable crystal grain size and higher crystallinity can be obtained after proper supplementation of lithium and secondary sintering. Moreover, a trace amount of $Fe^{2+}$ is oxidized to $Fe^{3+}$ by mild oxidation during primary sintering and reduced to $Fe^{2+}$ during secondary sintering at a higher temperature, so that the LiFePO$_4$ phase is finally maintained. Its electrochemical performance is characterized by perfect cycle performance at room temperature and at high temperature, and high compacted density, and this material also has the advantage of low cost.

In a feasible embodiment, the method has at least one of the following features (1) to (3):
(1) the mild oxidizing gas is a mixed gas of water vapor and CO$_2$ gas, and a ratio of flow rates of the water vapor and the CO$_2$ gas is from 1:9 to 9:1;
(2) the water vapor is derived from at least one of deionized water and ultrapure water, and the water vapor has a resistance of ≥18 MΩ; and
(3) the CO$_2$ gas has a purity of ≥99.0%.

In a feasible embodiment, the waste lithium iron phosphate is derived from at least one of waste lithium iron phosphate battery electrode sheets and a waste lithium iron phosphate slurry.

Optionally, the waste lithium iron phosphate battery electrode sheets include: waste LFP electrode sheets obtained by dismantling spent and decommissioned waste LFP batteries, waste LFP electrode sheets obtained by dismantling defective batteries scrapped from battery factories, and defective LFP electrode sheets scrapped from battery factories.

In a feasible embodiment, the method has at least one of the following to features (1) to (3):
(1) a mass ratio of the waste lithium iron phosphate to the mild oxidizing gas is from 1:0.1 to 1:10.0 (1:(0.1-10.0)), and the mild oxidizing gas is introduced at a constant flow rate;
(2) a heating device used in the primary sintering process includes any one of a tube furnace, a box furnace, a roller kiln, and a rotary kiln; and
(3) in the primary sintering, a temperature is maintained at 300° C. to 700° C. for 0.5 hours to 15 hours, and preferably the temperature is maintained at 400° C. to 600° C. for 4 hours to 8 hours.

In a feasible embodiment, the step of separating a lithium iron phosphate powder material from a material obtained by the primary sintering is specifically performed by: pulverizing and then separating the material obtained by the primary sintering.

Optionally, the material obtained by the primary sintering is mechanically pulverized and then sieved through a screen.

Optionally, the material is pulverized to have a median particle diameter ranging from 0.2 μm to 10.0 μm, preferably from 0.5 μm to 3.0 μm.

Optionally, the screen has a number of meshes ranging from 10 meshes to 400 meshes, preferably from 100 meshes to 325 meshes.

In a feasible embodiment, the method has at least one of the following features (1) to (2):
(1) the lithium source used for the supplementation of lithium includes any one or a combination of at least two of Li$_2$CO$_3$, LiOH·H$_2$O, Li$_3$PO$_4$, or LiNO$_3$; and
(2) the lithium source has a purity of an industrial grade or a battery grade.

In a feasible embodiment, the method has at least one of the following features (1) to (3):
(1) the supplementation of lithium includes wet supplementation of lithium and dry supplementation of lithium;
(2) Li$_2$CO$_3$ is used as the lithium source for dry supplementation of lithium, and the Li$_2$CO$_3$ has a median particle diameter ranging from 0.2 μm to 10 μm, preferably from 0.5 μm to 3 μm; and
(3) the lithium source is added in an amount calculated according to a molar ratio of Li:Fe, and an excess amount of Li ranges from 0.1% to 10.0%, preferably from 2.0% to 5.0%.

In a feasible embodiment, the carbon source includes any one or a combination of at least two of glucose, sucrose, citric acid, acetylene black, polypropylene, or polyethylene glycol.

In a feasible embodiment, the method has at least one of the following features (1) to (3):
(1) the supplementation of carbon includes wet supplementation of carbon and dry supplementation of carbon;
(2) the carbon source is added in an amount calculated such that the resulting recycled lithium iron phosphate will contain 1.0 wt % to 6.0 wt % of carbon; and
(3) a mixed carbon source of glucose and polyethylene glycol is used for dry supplementation of carbon, and the mixed carbon source has a median particle diameter ranging from 0.2 μm to 10.0 μm; optionally, in the mixed carbon source, glucose and polyethylene glycol are blended in a mass ratio ranging from 1:9 to 9:1.

In a feasible embodiment, the step of supplementing lithium and supplementing carbon to the lithium iron phosphate powder material and regulating the composition of the lithium iron phosphate powder material using a lithium source and a carbon source by means of secondary sintering, to obtain recycled lithium iron phosphate is specifically performed by:
mixing the lithium source and the carbon source with the lithium iron phosphate powder material and secondarily sintering the resulting mixture to obtain recycled lithium iron phosphate.

Optionally, the mixing method includes one of mixing in a VC mixer, mixing in a single-cone drying mixer, or mixing in a double-cone drying mixer.

Optionally, the mixing is performed for a duration of 0.1 hour to 8 hours, preferably 1 hour to 3 hours.

In a feasible embodiment, the method has at least one of the following features (1) to (5):
(1) the secondary sintering is performed under an inert gas, and the inert gas includes any one or a combination of at least two of nitrogen, argon, helium, neon, krypton, or xenon;
(2) a mass ratio of the lithium iron phosphate powder material to the inert gas is from 1:0.1 to 1:10.0 (1:(0.1-10.0)), preferably from 1:0.8 to 1:3.0 (1:(0.8-3.0));
(3) during the secondary sintering, the inert gas is introduced at a constant flow rate;
(4) in the secondary sintering, a temperature is maintained at 700° C. to 800° C. for 2 hours to 20 hours, and preferably the temperature is maintained at 730° C. to 770° C. for 6 hours to 16 hours;
the temperature in the secondary sintering may be maintained for a duration of 6 hours to 16 hours;
(5) a heating device used in the secondary sintering includes any one of a tube furnace, a box furnace, a roller kiln, or a rotary kiln, and may be a roller kiln.

In a feasible embodiment, after the recycled lithium iron phosphate is obtained, the method further includes: sieving and demagnetizing the recycled lithium iron phosphate.

In a feasible embodiment, the method includes steps of:
placing waste electrode sheets in a rotary kiln, into which a mixed gas of water vapor and carbon dioxide is introduced in a flow rate ratio of 4:6 to 6:4 and at a constant flow rate, increasing a temperature to 300° C. to 700° C. at a temperature increasing rate of 2° C./min to 5° C./min, maintaining the temperature for 0.5 hours to 15 hours, and cooling down along with the kiln, wherein a mass ratio of waste lithium iron phosphate, which is an active ingredient in the waste electrode sheets, to the mixed gas is from 1:0.1 to 1:10.0 (1:(0.1-10.0));

allowing the primarily sintered electrode sheets to be mechanically crushed and sieved through a screen with 10 to 400 meshes, and determining the content of Li, Fe, and C in a sieved out powder material by ICP and high-frequency infrared carbon and sulfur analysis; and using $Li_2CO_3$ with a median particle diameter of 0.2 to 10 μm, and a mixed carbon source of glucose and polyethylene glycol in a mass ratio of 1:9 to 9:1, supplementing lithium to an excess amount of Li of 0.1% to 10.0% based on a molar ratio of Li:Fe, wherein an amount of the carbon source added is calculated such that resulting recycled lithium iron phosphate has a carbon content of 1.0 wt % to 6.0 wt %, mixing a mixture in a VC mixer for 0.1 to 8 hours, introducing nitrogen as a protective gas into a box furnace, secondarily sintering a mixture, and cooling down a resultant along with the furnace, to obtain the recycled LFP, wherein in the secondary sintering, the temperature is increased to 700° C. to 800° C. at a temperature increasing rate of 2° C./min to 5° C./min and maintained for 2 to 20 hours.

The present disclosure further provides a recycled lithium iron phosphate, which is prepared by the method described above.

In a feasible embodiment, the recycled lithium iron phosphate has at least one of the following features (1) to (5):

(1) the recycled lithium iron phosphate material has a median particle diameter of 0.1 μm to 10.0 μm, preferably 0.5 μm to 5.0 μm;

(2) the recycled lithium iron phosphate material has a specific surface area of 1.0 $m^2$/g to 20.0 $m^2$/g, preferably 10.0 $m^2$/g to 15.0 $m^2$/g;

(3) the recycled lithium iron phosphate material has a compacted powder density of 1.0 g/$cm^3$ to 2.8 g/$cm^3$, preferably 2.0 g/$cm^3$ to 2.5 g/$cm^3$;

(4) the recycled lithium iron phosphate material has a pH of 6.0 to 12.0, preferably 8.0 to 10.0; and (5) the recycled lithium iron phosphate material contains 1.0 wt % to 6.0 wt %, preferably 1.5 wt % to 2.5 wt %, of carbon.

The present disclosure further provides a lithium ion battery, comprising the recycled lithium iron phosphate material described above.

DETAILED DESCRIPTION OF THE EMBODIMENTS

Figure 1:
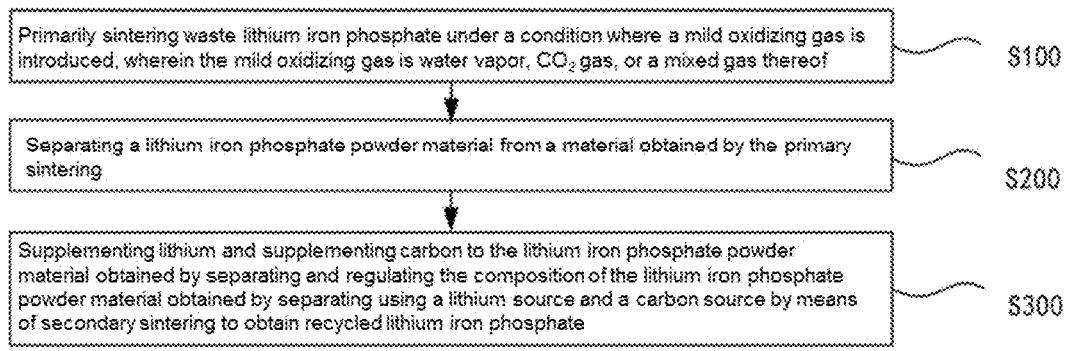
FIG. 1 is a schematic flowchart of a process for recycling a LFP positive electrode material according to an embodiment of the present disclosure.

The technical solutions of the present disclosure will be further described below with reference to the accompanying drawings by means of specific embodiments.

In order to achieve the above object, the following technical solutions are used in the present disclosure.

In a first aspect, a method for recycling waste lithium iron phosphate by selective oxidation-reduction according to an embodiment includes the following steps S100 to S300:

step S100 of primarily sintering waste lithium iron phosphate under a condition where a mild oxidizing gas is introduced;

step S200 of separating a lithium iron phosphate powder material from a material obtained by the primary sintering;

step S300 of supplementing lithium and supplementing carbon to the lithium iron phosphate powder material and regulating the composition of the lithium iron phosphate powder material using a lithium source and a carbon source by means of secondary sintering to obtain recycled lithium iron phosphate.

The mild oxidizing gas is water vapor, $CO_2$ gas, or a mixed gas thereof.

The waste lithium iron phosphate of the present disclosure may be lithium iron phosphate uncoated with carbon, or lithium iron phosphate coated with carbon.

In the method of the present disclosure, in step S300, a lithium source is used for supplementation of lithium, and a carbon source is used for supplementation of carbon and is used as a reducing agent. The quality is adjusted by the introduction of the lithium source and the carbon source. In the secondary sintering, Li is supplemented to the LFP crystal lattice, and carbon is supplemented in order to repair the coating carbon. The reducing agent allows a trace amount of $Fe^{3+}$ produced by oxidation in step S100 to be reduced to $Fe^{2+}$. In this way, the composition is regulated, and the $LiFePO_4$ phase is finally maintained.

In the present disclosure, waste lithium iron phosphate $LiFePO_4$ (hereinafter referred simply to as LFP) is used as a raw material and primarily sintered in a mild oxidizing gas selected from water vapor and/or $CO_2$. The binder in the waste LFP is deactivated by means of a gas-solid reaction, and at the same time amorphous coating carbon in the residual coating carbon is removed by selective oxidation, while graphitized carbon is not removed so that the residual coating carbon is graphitized to an increased degree. Since graphitized carbon has high conductivity and can suppress the growth of crystal grains of LFP, the waste LFP can be secondarily sintered at an increased temperature in step S300 for regulation of the composition with supplementary lithium and supplementary carbon without causing excessive growth of the crystal grains. Therefore, recycled LFP with a suitable crystal grain size and higher crystallinity can be finally obtained after proper supplementation of lithium and secondary sintering. Its electrochemical performance is characterized by perfect cycle performance at room temperature and at high temperature, high compacted density, and low cost.

The method of the present disclosure also has the following advantages over the prior art.

Firstly, in the present disclosure, primary sintering is performed in step S100 under a condition of a mild oxidizing gas, which can react with organic matters in the electrolytes to avoid the problem of corrosion of aluminum foils. If a relatively inert atmosphere such as nitrogen is used, it cannot react with the organic matters, which may result in the problem of corrosion of the aluminum foils.

Secondly, in the method of the present disclosure, primary sintering is performed in step S100 under a condition of a mild oxidizing gas, so that the binder (e.g., PVDF) can be deactivated and amorphous carbon (e.g., SP) can be oxidatively removed. If there is an aluminum foreign matter, the reaction interface between the lithium iron phosphate and the aluminum powder can be loosened by the above-mentioned method, thereby solving the problem of failing to remove the aluminum powder as a foreign matter in the prior art.

Optional technical solutions of the present disclosure are described below, but are not intended to limit the technical solutions according to the present disclosure. The technical objectives and advantageous effects of the present disclosure can be better accomplished and achieved by the following optional technical solutions.

In some embodiments, the mild oxidizing gas is a mixed gas of water vapor and $CO_2$ gas. Optionally, a ratio of flow rates of water vapor and $CO_2$ gas may be from 1:9 to 9:1, for example, 1:9, 2:8, 3:7, 3.5:6.5, 4:6, 5:5, 6:4, 7:3, 8:2, or 9:1. Further preferably, the flow rate ratio may be from 4:6 to 6:4.

In the present disclosure, a mixed gas of water vapor and $CO_2$ gas is preferably used for the following reasons. A mixed gas has a better effect than a single gas when in use. A single type of water vapor has an excessively high oxidizing property, by which almost all the lithium iron phosphate will be oxidized together. If almost all the lithium iron phosphate is oxidized, it can hardly be completely reduced during subsequent reduction, and there will still be a trace amount of $Fe^{3+}$. In contrast, the mixed gas has a more suitable oxidizing property, so that at most a trace amount of lithium iron phosphate is oxidized after oxidative decarburization and can be easily fully reduced and repaired during secondary sintering. A single type of carbon dioxide is not sufficiently oxidizing and has little effect at medium and low temperatures (e.g., 300 to 600° C.). If the temperature rises to about 700° C., the aluminum foils will be pulverized and can hardly be separated later. An appropriate oxygen potential can be regulated by using the mixed gas of water vapor and carbon dioxide, so that the amorphous carbon component can be oxidatively removed within a target temperature range while the lithium iron phosphate is not oxidized (Although a trace amount of $Fe^{2+}$ is oxidized to $Fe^{3+}$, it can be reduced in the carbon repair process in step (3) due to its small content). The recycled LFP thus obtained can have a strictly controlled $Fe^{3+}/Fe^{2+}$ and exhibit better specific capacity and cycle performance.

In some embodiments, the water vapor is derived from at least one of deionized water and ultrapure water. Optionally, the water vapor has a resistance of ≥18 MΩ, for example, 18 MΩ, 20 MΩ, 30 MΩ, 35 MΩ, 40 MΩ, or 50 MΩ.

In some embodiments, the $CO_2$ may be $CO_2$ of an industrial grade with a purity≥99.0%.

In the present disclosure, the source of the waste lithium iron phosphate is not limited. For example, it may be derived from waste lithium iron phosphate battery electrode sheets and/or a waste lithium iron phosphate slurry.

Specifically, the waste lithium iron phosphate battery electrode sheets include: waste LFP electrode sheets obtained by dismantling spent and decommissioned waste LFP batteries, waste LFP electrode sheets obtained by dismantling defective batteries (which may be products into which electrolytes are injected, or products into which electrolytes are not injected) scrapped from battery factories, and defective LFP electrode sheets scrapped from battery factories.

In some embodiments, the mass ratio of waste lithium iron phosphate (which refers here to the amount of lithium iron phosphate contained as an active ingredient in the electrode sheets or in the slurry) to the mild oxidizing gas is from 1:0.1 to 1:10.0 (1:(0.1-10.0)), for example, 1:0.1, 1:0.5, 1:1, 1:2, 1:3, 1:3.5, 1:4, 1:5, 1:6, 1:7, 1:8, or 1:10, but it is not limited to the listed values. Other unlisted values in this numerical range are also applicable. Preferably, the mass ratio may be from 1:0.8 to 1:3.0 (1:(0.8-3.0)). If the mild oxidizing gas is used at an excessively low concentration, the binder cannot be fully deactivated, and the amorphous coating carbon cannot be effectively oxidatively removed. If the mild oxidizing gas is used at an excessively high concentration, excessive lithium iron phosphate is oxidized, which affects the performance of the final recycled lithium iron phosphate.

In the present disclosure, the gas flow rate may be calculated according to the total mass of the mild oxidizing gas used and the total duration of material feeding-material discharging.

In some embodiments, in the primary sintering process, the mild oxidizing gas is introduced at a constant flow rate.

In some embodiments, a heating device used in the primary sintering process includes any one of a tube furnace, a box furnace, a roller kiln, or a rotary kiln, and may be a rotary kiln.

In some embodiments, the temperature in the primary sintering is maintained at 300° C. to 650° C., for example, 300° C., 350° C., 400° C., 500° C., 550° C., 600° C., or 650° C., but it is not limited to the listed values. Other unlisted values in this numerical range are also applicable. Preferably, the temperature may be from 400° C. to 600° C. If the primary sintering is performed at an excessively low temperature, the binder cannot be fully deactivated, and the amorphous coating carbon cannot be effectively oxidatively removed. If the primary sintering is performed at an excessively high temperature (for example at 700° C.), the aluminum foils are pulverized so that it is difficult to separate the aluminum-containing powder, and at the same time excessive lithium iron phosphate is oxidized, which affects the performance of the final recycled lithium iron phosphate.

In some embodiments, the temperature in the primary sintering is maintained for a duration of 0.5 hours to 15 hours, for example, 0.5 hours, 1 hour, 2 hours, 3 hours, 4 hours, 5 hours, 6 hours, 7 hours, 8 hours, 10 hours, 11 hours, 13 hours, or 14 hours, but it is not limited to the listed values. Other unlisted values within this numerical range are also applicable. Preferably, the duration may be from 4 hours to 8 hours.

In some embodiments, step S200 includes but is not limited to: pulverizing and then separating the material obtained by the primary sintering.

In the present disclosure, the solutions that can be used in step S200 include, but are not limited to, mechanical crushing followed by sieving through a screen, and jet pulverizing followed by cyclone separation. Further, optionally, the material obtained by the primary sintering may be mechanically pulverized and then sieved through a screen.

In some embodiments, the material is pulverized to a median particle diameter ranging from 0.2 μm to 10.0 μm, for example, 0.2 μm, 0.5 μm, 1 μm, 1.5 μm, 2 μm, 3 μm, 4 μm, 6 μm, 8 μm, or 10 μm, but the median particle diameter is not limited to the listed values. Other unlisted values within this numerical range are also applicable. Preferably, the median particle diameter may be from 0.5 µm to 3.0 µm.

In some embodiments, the screen has a number of meshes ranging from 10 meshes to 400 meshes, for example, 10 meshes, 40 meshes, 80 meshes, 100 meshes, 125 meshes, 150 meshes, 200 meshes, 240 meshes, 300 meshes, or 325 meshes, but the number of meshes is not limited to the listed values. Other unlisted values within the numerical range are also applicable. Preferably, the number of meshes may be from 100 meshes to 325 meshes.

In some embodiments, the lithium source used for supplementation of lithium in step S300 includes, but is not limited to, any one or a combination of at least two of $Li_2CO_3$, $LiOH·H_2O$, $Li_3PO_4$, or $LiNO_3$, and may preferably be $Li_2CO_3$.

The lithium source described in the present disclosure may have a purity of an industrial grade or a battery grade, preferably a battery grade.

In some embodiments, the method for supplementing lithium in step S300 includes, but is not limited to, wet supplementation of lithium and dry supplementation of lithium, preferably dry supplementation of lithium.

In some embodiments, in step S300, $Li_2CO_3$ is used as a lithium source for dry supplementation of lithium. $Li_2CO_3$ has a median particle diameter ranging from 0.2 µm to 10 µm, for example, 0.2 µm, 0.5 µm, 1 µm, 3 µm, 5 µm, 6 µm, 7 µm, 8 µm, or 10 µm. Those skilled in the art can control the particle size of $Li_2CO_3$ within the above-mentioned range by means of crushing. In this optional technical solution, lithium carbonate is a widely used raw material for conventional production of lithium iron phosphate. At the temperature for secondary sintering of lithium iron phosphate to be recycled, Li in the lithium carbonate with a particle size in this range can be efficiently supplemented to the crystal lattice of the lithium iron phosphate to be recycled, to replenish the content of active Li. More preferably, the median particle diameter ranges from 0.5 µm to 3.0 µm.

In some embodiments, in step S300, the lithium source is added in an amount calculated according to a molar ratio of Li:Fe. An excess amount of Li ranges from 0.1% to 10.0%, for example, 0.1%, 0.5%, 1%, 2%, 3%, 5%, 6%, 7%, 8%, or 10%, preferably from 2% to 5%.

In some embodiments, the carbon source in step S300 includes any one or a combination of at least two of glucose, sucrose, citric acid, acetylene black, polypropylene, or polyethylene glycol. Typical, but non-limiting, examples of the combination include: a combination of glucose and sucrose, a combination of glucose and citric acid, a combination of sucrose and acetylene black, a combination of sucrose and polypropylene, a combination of glucose, sucrose and acetylene black, a combination of glucose, sucrose, citric acid and ethylene glycol, etc.

In some embodiments, the method for supplementing carbon includes, but is not limited to: wet supplementation of carbon and dry supplementation of carbon, preferably dry supplementation of carbon.

In some embodiments, the carbon source is added in an amount calculated such that the carbon content in the resulting recycled lithium iron phosphate will be from 1.0 wt % to 6.0 wt %, for example, 1 wt %, 2 wt %, 3 wt %, 3.5 wt %, 4 wt %, 4.5 wt %, 5 wt %, or 6 wt %, but the carbon content is not limited to the listed values. Other unlisted values within this numerical range are also applicable. Preferably, the carbon content in the resulting recycled lithium iron phosphate is from 1.5 wt % to 2.5 wt %.

In some embodiments, a mixed carbon source of glucose and polyethylene glycol is used for dry supplementation of carbon. The mixed carbon source has a median particle diameter ranging from 0.2 µm to 10.0 µm, for example, 0.2 µm, 1 µm, 3 µm, 3 µm, 7 µm, 8 µm, or 10 µm. Those skilled in the art can control the particle size of the mixed carbon source within the above-mentioned range by means of crushing. In this optional technical solution, the types and the thermal pyrolysis temperatures of glucose and polyethylene glycol are better matched with each other. Glucose and polyethylene glycol having a median particle diameter within a suitable range can be mixed with the powder material uniformly with a better effect and can achieve a synergistic optimization effect. More preferably, the median particle diameter ranges from 0.5 µm to 3.0 µm.

In some embodiments, in the mixed carbon source, glucose and polyethylene glycol are blended in a mass ratio ranging from 1:9 to 9:1, for example 1:9, 2:8, 3:7, 3.5:6.5, 4:6, 5:5, 6:4, 7:3, 8:2, or 9:1, but it is not limited to the listed values. Other unlisted values within this numerical range are also applicable. Preferably, the mass ratio may be from 4:6 to 6:4.

In some embodiments, step S300 includes: mixing the lithium source and the carbon source with the lithium iron phosphate powder material obtained by the separation in step S200 and secondarily sintering the resulting mixture to obtain recycled lithium iron phosphate. This is a method for dry supplementation of lithium and dry supplementation of carbon, by which the effects of supplementing Li to the crystal lattice and carbon repairing can be achieved at the same time.

In some embodiments, the mixing method includes, but is not limited to, any one of mixing in a VC mixer, mixing in a single-cone drying mixer, or mixing in a double-cone drying mixer.

In some embodiments, the mixing duration is from 0.1 hours to 8 hours, for example, 0.1 hours, 1 hour, 2 hours, 3 hours, 4 hours, 5 hours, 7 hours, or 8 hours, but it is not limited to the listed values. Other unlisted values within this numerical range are also applicable. Preferably, the mixing duration may be from 1 hour to 3 hours.

In some embodiments, the secondary sintering is performed under an inert gas. The inert gas includes any one or a combination of at least two of nitrogen, argon, helium, neon, krypton, or xenon.

In some embodiments, the mass ratio of the lithium iron phosphate powder material obtained by the separation in step S200 to the inert gas is from 1:0.1 to 1:10.0 (1:(0.1-10.0)), for example, 1:0.1, 1:0.5, 1:1, 1:2, 1:3, 1:3.5, 1:4, 1:5, 1:6, 1:7, 1:8, or 1:10, preferably from 1:0.8 to 1:3.0 (1:(0.8-3.0)).

In some embodiments, in the secondary sintering process, the inert gas is introduced at a constant flow rate.

In some embodiments, the temperature in the secondary sintering is maintained at 700° C. to 800° C., for example, 700° C., 725° C., 750° C., 765° C., 780° C., or 800° C. A better repairing effect can be achieved by secondary sintering at a temperature within this range. Preferably, the temperature may be from 730° C. to 770° C.

In some embodiments, the temperature in the secondary sintering is maintained for a duration of 2 hours to 20 hours, for example, 2 hours, 4 hours, 6 hours, 8 hours, 10 hours, 12 hours, 13 hours, 15 hours, 18 hours, or 20 hours, preferably from 6 hours to 16 hours.

In some embodiments, the heating device used in the secondary sintering includes any one of a tube furnace, a box furnace, a roller kiln, or a rotary kiln, and may be a roller kiln.

As a further optional technical solution of the method described in the present disclosure, the method includes the steps of:

placing waste electrode sheets in a rotary kiln, into which a mixed gas of water vapor and carbon dioxide is introduced in a flow rate ratio of 4:6 to 6:4 and at a constant flow rate, heating up the waste electrode sheets to a temperature of 300° C. to 700° C. at a temperature increasing rate of 2 to 5° C./min, maintaining the temperature for 0.5 to 15 hours, and cooling down the resultant along with the kiln, wherein a mass ratio of waste lithium iron phosphate, which is an active ingredient in the waste electrode sheets, to the mixed gas is from 1:0.1 to 1:10.0 (1:(0.1-10.0));

allowing the primarily sintered electrode sheets to be mechanically crushed and sieved through a screen with 10 to 400 meshes, and determining the content of Li, Fe, and C in a sieved out powder material by ICP and high-frequency infrared carbon and sulfur analysis; and using $Li_2CO_3$ with a median particle diameter of 0.2 to 10 μm, and a mixed carbon source of glucose and polyethylene glycol in a mass ratio of 1:9 to 9:1, supplementing lithium to an excess amount of Li of 0.1 to 10.0% based on a molar ratio of Li:Fe, wherein an amount of the carbon source added is calculated such that resulting recycled lithium iron phosphate has a carbon content of 1.0 wt % to 6.0 wt %, mixing a mixture in a VC mixer for 0.1 to 8 hours, introducing nitrogen as a protective gas into a box furnace, secondarily sintering a mixture, and cooling down a resultant along with the furnace, to obtain the recycled LFP, wherein in the secondary sintering, the temperature is increased to 700 to 800° C. at a temperature increasing rate of 2 to 5° C./min and maintained for 2 to 20 hours.

In a second aspect, another embodiment provides a recycled lithium iron phosphate which is prepared by the method of the foregoing embodiment.

In some embodiments, the recycled LFP positive electrode material has a median particle diameter of 0.1 μm to 10.0 μm, for example, 0.1 μm, 0.5 μm, 1.5 μm, 3 μm, 4 μm, 5 μm, 6 μm, 7 μm, 8 μm, 9 μm, or 10 μm, preferably from 0.5 μm to 5.0 μm.

In some embodiments, the recycled LFP positive electrode material has a specific surface area of 1.0 $m^2$/g to 20.0 $m^2$/g, preferably 10.0 $m^2$/g to 15.0 $m^2$/g, for example, 10 $m^2$/g, 12 $m^2$/g, 14 $m^2$/g, 15 $m^2$/g, 17 $m^2$/g, 18 $m^2$/g, or 20 $m^2$/g.

In some embodiments, the recycled LFP positive electrode material has a compacted powder density of 1.0 g/$cm^3$ to 2.8 g/$cm^3$, preferably 2.0 g/$cm^3$ to 2.5 g/$cm^3$, for example, 2.0 g/$cm^3$, 2.1 g/$cm^3$, 2.2 g/$cm^3$, 2.3 g/$cm^3$, 2.4 g/$cm^3$, or 2.5 g/$cm^3$.

In some embodiments, the recycled LFP positive electrode material has a pH of 6.0 to 12.0, for example, 6.0, 6.5, 7.0, 7.5, 8.0, 9.0, 9.5, 10.0, 11.0, or 12.0, preferably from 8.0 to 10.0.

In some embodiments, the carbon content (i.e., the total amount of residual carbon and supplementary carbon) in the recycled LFP positive electrode material is from 1.0 wt % to 6.0 wt %, for example, 1.0 wt %, 1.5 wt %, 2.0 wt %, 3.0 wt %, 4.0 wt %, 4.5 wt %, 5.0 wt %, or 6.0 wt %, preferably from 1.5 wt % to 2.5 wt %.

In a third aspect, the present disclosure provides a lithium ion battery, comprising the recycled lithium iron phosphate positive electrode material described in the second aspect.

The type of the lithium ion battery is not limited in the present disclosure. For example, it may be a conventional lithium ion battery with an aluminum shell, a steel shell, or a soft pack.

The method for assembling a battery using the powdered recycled lithium iron phosphate positive electrode material is not limited in the present disclosure, and batteries can be assembled by those skilled in the art with reference to the methods disclosed in the prior art.

The present disclosure also provides a method for making a positive electrode sheet by using the recycled lithium iron phosphate, which includes:

mixing the recycled LFP positive electrode material, a conductive agent, and a binder in a mass ratio of (95 to 96):(1 to 2):(2 to 4) in a solvent, applying the mixture to a current collector made of aluminum foil, and baking the resultant in a vacuum atmosphere to make a positive electrode sheet.

In some embodiments, the lithium ion battery comprises a negative electrode sheet made of a negative electrode active material including any one or a combination of at least two of artificial graphite, natural graphite, a silicon carbon material, or a silicon oxygen material.

In some embodiments, the conductive agent includes graphite powder and/or a nano conductive liquid.

In some embodiments, the nano conductive liquid is composed of 0.5 wt % to 20 wt % of a nanocarbon material and a dispersion solvent.

In some embodiments, the nanocarbon material includes any one or a combination of at least two of graphene, carbon nanotubes, carbon nanofibers, fullerene, carbon black, or acetylene black.

In some embodiments, the graphene has 1 to 100 layers of graphite sheets.

In some embodiments, the carbon nanotubes and the carbon nanofibers each have a diameter of 0.2 nm to 500 nm.

In some embodiments, the fullerene, the carbon black, and the acetylene black each have a particle size of 1 nm to 200 nm.

In some embodiments, the binder includes one or a combination of at least two of polyvinylidene fluoride, sodium carboxymethyl cellulose, lithium carboxymethyl cellulose, polyacrylic acid, carboxylated chitosan, polymethyl methacrylate, polyvinyl acetate, and an acrylonitrile multipolymer.

Positive electrode materials of Examples 1 to 8 and Comparative Examples 1 to 3 were tested by using the following methods.

The compacted powder density described in the present disclosure was tested by using a CARVER powder compactor, where the compacted powder density=the mass of a test sample/the volume of the test sample; and the compacted density of an electrode sheet=(the mass of the positive electrode sheet−the mass of the aluminum foil)/(the area of the electrode sheet×the thickness of the compacted electrode sheet).

The specific surface areas of the materials were tested by using an full-automatic specific surface area/porosity analyzer Tristar3000 (Micrometrics Instrument Corporation, USA).

The particle diameter ranges of the materials and the average particle diameters of raw material particles were tested by using a laser granulometer MS 2000 (Malvern).

The structures of the materials were tested by using an X-ray diffractometer (X'Pert Pro, PANalytical).

The surface morphologies and particle sizes of the samples were observed by using a scanning electron microscope S4800 (Hitachi).

The electrochemical cycle performance was tested by using the following method. Each positive electrode material, a conductive agent, and a binder were dissolved and mixed in a solvent in a mass ratio of 95:2:3 such that the solid content was controlled at 50%, and the mixture was applied to a current collector made of aluminum foil, which was then dried in vacuum to make a positive electrode sheet. Then, a 18650 cylindrical battery cell was assembled by a conventional production process from a negative electrode sheet made from artificial graphite by a traditional developed process, an electrolyte made of 1 mol/L $LiPF_6$/EC+DMC+EMC (v/v=1:1:1), a Celgard2400 separator, and a shell.

The charge and discharge tests of the cylindrical batteries were performed on a LAND battery test system (Wuhan Jinnuo Electronics Co., Ltd, China) under a room temperature condition, where the batteries were charged and discharged with a constant current at 0.1 C, and the charge and discharge voltages were limited to 2.5 V to 3.7 V.

The cycle performance of the cylindrical batteries was tested on the LAND battery test system (Wuhan Jinnuo Electronics Co., Ltd, China) under a room temperature condition at 1 C/1 C, where the charge and discharge voltages were limited to 2.0 to 3.65V.

Example 1

This example provides a method for recycling waste lithium iron phosphate by selective oxidation-reduction, in which defective LFP electrode sheets scrapped from battery factories are used as raw materials, lithium carbonate is used as a lithium source, and 50 wt % of glucose and 50 wt % of polyethylene glycol are used as a mixed carbon source.

FIG. 1 is a schematic flowchart of a process for recycling a LFP positive electrode material according to an embodiment of the present disclosure. As shown in FIG. 1, the preparation method is as follows.

(1) The waste electrode sheets were placed in a rotary kiln, into which a mixed gas of water vapor and carbon dioxide was introduced in a flow rate ratio of water vapor to carbon dioxide of 4:6 and at a constant flow rate. The waste electrode sheets were heated up to a temperature of 500° C. at a temperature increasing rate of 2° C./min and maintained at the temperature for 6 hours, and then cooled down along with the kiln.

(2) The primarily sintered electrode sheets were mechanically crushed to a median particle diameter of 3.0 μm and passed through a 200-mesh screen. The content of Li, Fe, and C in a powder material sieved out was determined by ICP and high-frequency infrared carbon and sulfur analysis.

(3) The lithium source and the mixed carbon source with a median particle diameter of 2.0 μm were used such that lithium was supplemented to reach a molar ratio of Li:Fe of 1.05:1 and that the total amount of residual carbon and supplementary carbon was 3 wt %, and the mixture was mixed in a VC mixer for 2 hours. Nitrogen was introduced into the box furnace as a protective gas. The mixture was heated up to a temperature of 750° C. at a temperature increasing rate of 2° C./min and maintained at the temperature for 8 hours, and then cooled down along with the furnace to obtain recycled LFP.

Figure 2:
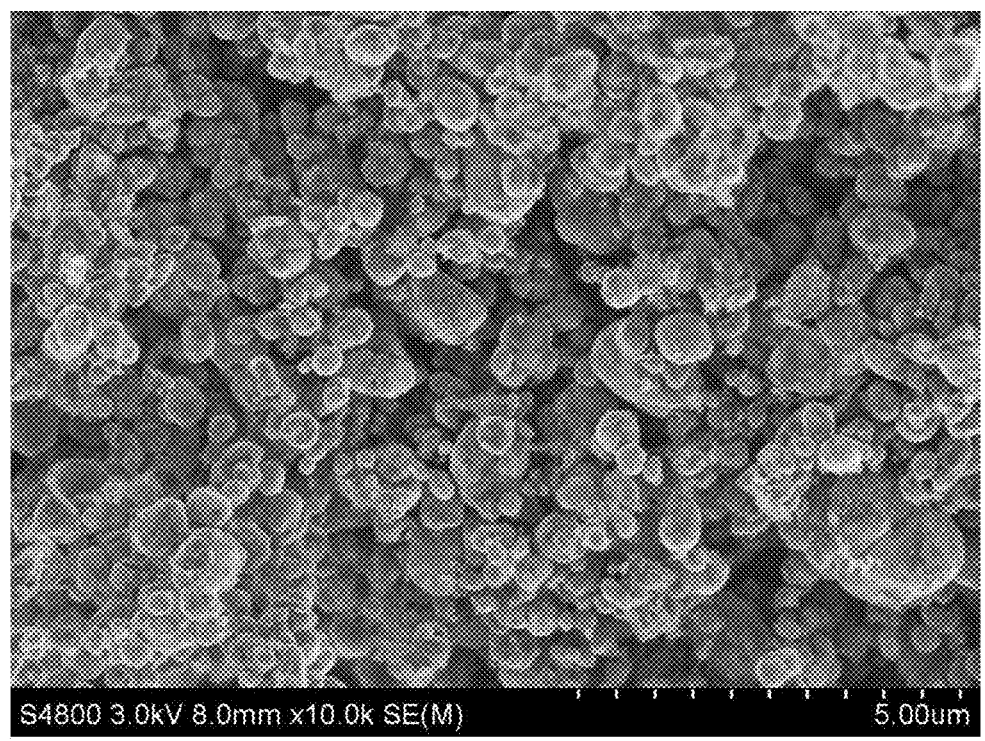
FIG. 2 is an electron microscopic picture of a recycled LFP positive electrode material in Example 1 of the present disclosure.

FIG. 2 is an electron microscopic picture of the recycled LFP positive electrode material in this example. It can be seen from FIG. 2 that the prepared material has a uniform particle diameter distribution.

Figure 3:
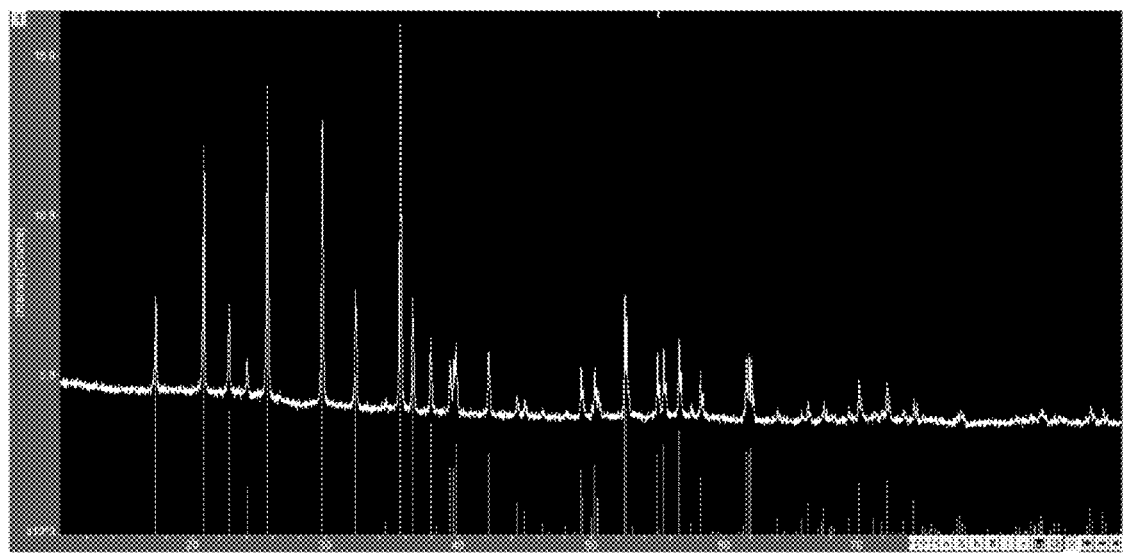
FIG. 3 is an XRD pattern of the recycled LFP positive electrode material in Example 1 of the present disclosure.

FIG. 3 is an XRD pattern of the recycled LFP positive electrode material in this example. It can be seen from FIG. 3 that the material has only a diffraction peak of lithium iron phosphate and does not have an impurity peak.

Figure 4:
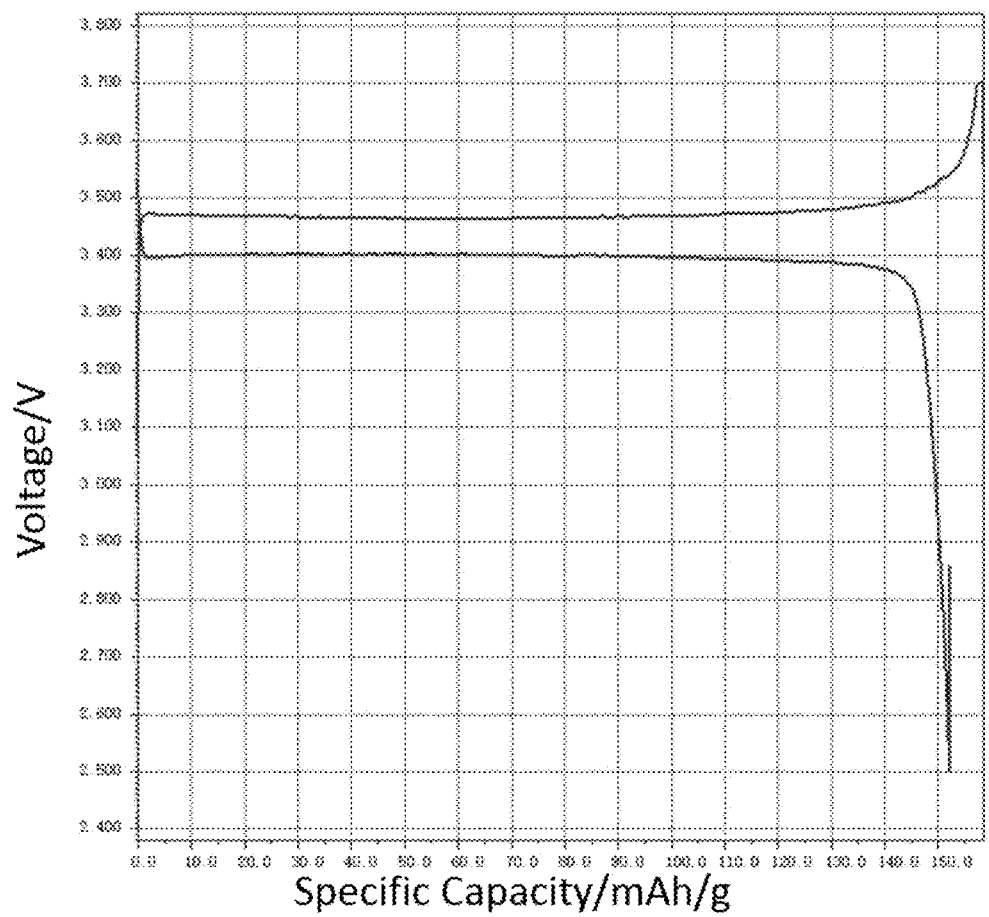
FIG. 4 is an initial charge/discharge curve of the recycled LFP positive electrode material in Example 1 of the present disclosure.

FIG. 4 is an initial charge/discharge curve of the recycled LFP positive electrode material in this example.

Figure 5:
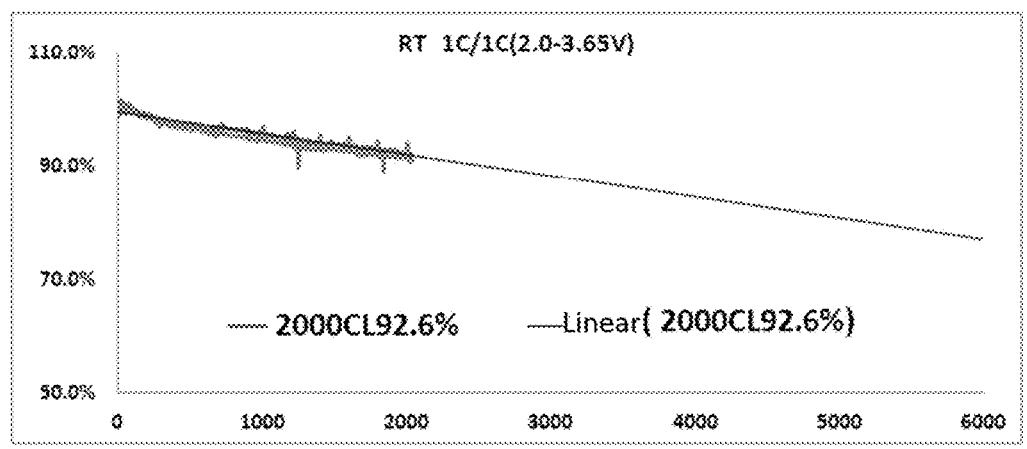
FIG. 5 is a cycle performance curve of the recycled LFP positive electrode material in Example 1 of the present disclosure.

FIG. 5 is a cycle performance curve of the recycled LFP positive electrode material in this example, where the irregular thick line represents actual measured data, and the thinner straight line represents the attenuation trend of the thick line, for predicting the number of cycles when the capacity is attenuated to 80%.

It can be seen from FIGS. 4 and 5 that the material has a discharge specific capacity close to that of conventional lithium iron phosphate and has excellent cycle performance.

Example 2

This example provides a method for recycling waste lithium iron phosphate by selective oxidation-reduction.

LFP electrode sheets dismantled from defective batteries from battery factories were used as raw materials, lithium carbonate was used as a lithium source, and 60 wt % of sucrose and 40 wt % of polyethylene glycol were used as a mixed carbon source.

The preparation method was as follows.

(1) The waste electrode sheets were placed in a rotary kiln, into which a mixed gas of water vapor and carbon dioxide was introduced in a flow rate ratio of water vapor to carbon dioxide of 3:7 and at a constant flow rate. The waste electrode sheets were heated up to a temperature of 530° C. at a temperature increasing rate of 2° C./min and maintained at the temperature for 7 hours, and then cooled down along with the kiln.

(2) The primarily sintered electrode sheets were mechanically crushed to a median particle diameter of 3.5 μm and passed through a 200-mesh screen. The content of Li, Fe, and C in a powder material sieved out was determined by ICP and high-frequency infrared carbon and sulfur analysis.

(3) The lithium source and the mixed carbon source with a median particle diameter of 2.2 μm were used such that lithium was supplemented to reach a molar ratio of Li:Fe of 1.02:1 and that the total amount of residual carbon and supplementary carbon was 2.5 wt %, and the mixture was mixed in a VC mixer for 3 hours. Nitrogen was introduced into the box furnace as a protective gas. The mixture was heated up to a temperature of 760° C. at a temperature increasing rate of 2° C./min and maintained at the temperature for 8 hours, and then cooled down along with the furnace to obtain recycled LFP.

Example 3

This example provides a method for recycling waste lithium iron phosphate by selective oxidation-reduction.

LFP electrode sheets dismantled from spent and obsolete batteries were used as raw materials, lithium hydroxide was used as a lithium source, and 50 wt % of sucrose and 50 wt % of polypropylene were used as a mixed carbon source.

The preparation method was as follows.
(1) The waste electrode sheets were initially crushed and then placed in a rotary kiln, into which a mixed gas of water vapor and carbon dioxide was introduced in a flow rate ratio of water vapor to carbon dioxide of 3:7 and at a constant flow rate. The waste electrode sheets were heated up to a temperature of 550° C. at a temperature increasing rate of 2° C./min and maintained at the temperature for 5 hours, and then cooled down along with the kiln.
(2) The primarily sintered electrode sheets were finely grounded and crushed to have a median particle diameter of 2.0 μm and passed through a 200-mesh screen. The content of Li, Fe, and C in a powder material sieved out was determined by ICP and high-frequency infrared carbon and sulfur analysis.
(3) The lithium source and the mixed carbon source with a median particle diameter of 1.8 μm were used such that lithium was supplemented to reach a molar ratio of Li:Fe of 1.08:1 and that the total amount of residual carbon and supplementary carbon was 2.5 wt %, and the mixture was mixed in a VC mixer for 5 hours. Nitrogen was introduced into the box furnace as a protective gas. The mixture was heated up to a temperature of 740° C. at a temperature increasing rate of 2° C./min and maintained at the temperature for 12 hours, and then cooled down along with the furnace to obtain recycled LFP.

Example 4

This example provides a method for recycling waste lithium iron phosphate by selective oxidation-reduction.

Defective LFP electrode sheets scrapped from battery factories were used as raw materials, lithium hydroxide was used as a lithium source, and 40 wt % of citric acid and 60 wt % of polypropylene were used as a mixed carbon source.

The preparation method was as follows.
(1) The waste electrode sheets were initially crushed and then placed in a rotary kiln, into which a mixed gas of water vapor and carbon dioxide was introduced in a flow rate ratio of water vapor to carbon dioxide of 5:5 and at a constant flow rate. The waste electrode sheets were heated up to a temperature of 570° C. at a temperature increasing rate of 2° C./min and maintained at the temperature for 1 hour, and then cooled down along with the kiln.
(2) The primarily sintered electrode sheets were finely grounded and crushed to have a median particle diameter of 2.7 μm and passed through a 200-mesh screen. The content of Li, Fe, and C in a powder material sieved out was determined by ICP and high-frequency infrared carbon and sulfur analysis.
(3) The lithium source and the mixed carbon source with a median particle diameter of 2.7 μm were used such that lithium was supplemented to reach a molar ratio of Li:Fe of 1.04:1 and that the total amount of residual carbon and supplementary carbon was 2.8 wt %, and the mixture was mixed in a VC mixer for 2 hours. Nitrogen was introduced into the box furnace as a protective gas. The mixture was heated up to a temperature of 720° C. at a temperature increasing rate of 2° C./min and maintained at the temperature for 14 hours, and then cooled down along with the furnace to obtain recycled LFP.

Example 5

This example provides a method for recycling waste lithium iron phosphate by selective oxidation-reduction.

LFP electrode sheets dismantled from defective batteries from battery factories were used as raw materials, lithium carbonate was used as a lithium source, and 60 wt % of acetylene black and 40 wt % of sucrose were used as a mixed carbon source.

The preparation method was as follows.
(1) The waste electrode sheets were initially crushed and then placed in a rotary kiln, into which a mixed gas of water vapor and carbon dioxide was introduced in a flow rate ratio of water vapor to carbon dioxide of 3:7 and at a constant flow rate. The waste electrode sheets were heated up to a temperature of 510° C. at a temperature increasing rate of 2° C./min and maintained at the temperature for 6 hours, and then cooled down along with the kiln.
(2) The primarily sintered electrode sheets were finely grounded and crushed to have a median particle diameter of 2.0 μm and passed through a 200-mesh screen. The content of Li, Fe, and C in a powder material sieved out was determined by ICP and high-frequency infrared carbon and sulfur analysis.
(3) The lithium source and the mixed carbon source with a median particle diameter of 2.2 μm were used such that lithium was supplemented to reach a molar ratio of Li:Fe of 1.01:1 and that the total amount of residual carbon and supplementary carbon was 2.2 wt %, and the mixture was mixed in a VC mixer for 3 hours. Nitrogen was introduced into the box furnace as a protective gas. The mixture was heated up to a temperature of 740° C. at a temperature increasing rate of 2° C./min and maintained at the temperature for 10 hours, and then cooled down along with the furnace to obtain recycled LFP.

Example 6

This example provides a method for recycling waste lithium iron phosphate by selective oxidation-reduction, in which defective LFP electrode sheets scrapped from battery factories are used as raw materials, $LiNO_3$ is used as a lithium source, and sucrose is used as a carbon source.

The preparation method was as follows.
(1) The waste electrode sheets were placed in a rotary kiln, into which a mixed gas of water vapor and carbon dioxide was introduced in a flow rate ratio of water vapor to carbon dioxide of 8:2 and at a constant flow rate. The waste electrode sheets were heated up to a temperature of 400° C. at a temperature increasing rate of 3° C./min and maintained at the temperature for 8 hours, and then cooled down along with the kiln.
(2) The primarily sintered electrode sheets were mechanically crushed to a median particle diameter of 2.5 μm and passed through a 325-mesh screen. The content of Li, Fe, and C in a powder material sieved out was determined by ICP and high-frequency infrared carbon and sulfur analysis.
(3) The lithium source and the mixed carbon source with a median particle diameter of 4.0 μm were used such that lithium was supplemented to reach a molar ratio of Li:Fe of 1.08:1 and that the total amount of residual carbon and supplementary carbon was 3.5 wt %, and the mixture was mixed in a VC mixer for 7 hours. Nitrogen was introduced into the box furnace as a protective gas. The mixture was heated up to a temperature of 770° C. at a temperature increasing rate of 5° C./min and maintained at the temperature for 6 hours, and then cooled down along with the furnace to obtain recycled LFP.

Example 7

This example provides a method for recycling waste lithium iron phosphate by selective oxidation-reduction, in which defective LFP electrode sheets scrapped from battery factories are used as raw materials, $Li_3PO_4$ is used as a lithium source, and polypropylene is used as a carbon source.

The preparation method was as follows.
(1) The waste electrode sheets were placed in a rotary kiln, into which a mixed gas of water vapor and carbon dioxide was introduced in a flow rate ratio of water vapor to carbon dioxide of 7:3 and at a constant flow rate. The waste electrode sheets were heated up to a temperature of 450° C. at a temperature increasing rate of 4° C./min and maintained at the temperature for 13 hours, and then cooled down along with the kiln.
(2) The primarily sintered electrode sheets were mechanically crushed to a median particle diameter of 3.0 μm and passed through a 150-mesh screen. The content of Li, Fe, and C in a powder material sieved out was determined by ICP and high-frequency infrared carbon and sulfur analysis.
(3) The lithium source and the mixed carbon source with a median particle diameter of 1.3 μm were used such that lithium was supplemented to reach a molar ratio of Li:Fe of 1.02:1 and that the total amount of residual carbon and supplementary carbon was 3.0 wt %, and the mixture was mixed in a VC mixer for 5.5 hours. Nitrogen was introduced into the box furnace as a protective gas. The mixture was heated up to a temperature of 715° C. at a temperature increasing rate of 5° C./min and maintained at the temperature for 16 hours, and then cooled down along with the furnace to obtain recycled LFP.

Example 8

This example provides a method for recycling waste lithium iron phosphate by selective oxidation-reduction, in which a lithium iron phosphate slurry scrapped from a battery factory is used as a raw material, lithium carbonate is used as a lithium source, and polyethylene glycol and sucrose are used as a carbon source.

The preparation method was as follows.
(1) The waste slurry was centrifuged and dried to obtain a black powder which was placed in a rotary kiln, into which a mixed gas of water vapor and carbon dioxide was introduced in a flow rate ratio of water vapor to carbon dioxide of 7:3 and at a constant flow rate. The resultant was heated up to a temperature of 450° C. at a temperature increasing rate of 4° C./min and maintained at the temperature for 10 hours, and then cooled down along with the kiln.
(2) The primarily sintered electrode sheets were mechanically crushed to a median particle diameter of 2.0 μm and passed through a 150-mesh screen. The content of Li, Fe, and C in a powder material sieved out was determined by ICP and high-frequency infrared carbon and sulfur analysis.
(3) The lithium source and the mixed carbon source with a median particle diameter of 1.0 μm were used such that lithium was supplemented to reach a molar ratio of Li:Fe of 1.02:1 and that the total amount of residual carbon and supplementary carbon was 2.0 wt %, and the mixture was mixed in a VC mixer for 5.5 hours. Nitrogen was introduced into the box furnace as a protective gas. The mixture was heated up to a temperature of 745° C. at a temperature increasing rate of 5° C./min and maintained at the temperature for 12 hours, and then cooled down along with the furnace to obtain recycled LFP.

Comparative Example 1

A recycled LFP positive electrode material was prepared in basically the same way as in Example 1, except that nitrogen was used as a protector in the primary sintering, and a carbon source was not used for supplementation of carbon in step (3). A battery was fabricated in the same way as in Example 1.

Comparative Example 2

This comparative example was the same as Example 1, except that the mixed gas of water vapor and carbon dioxide was replaced with water vapor, and the amount of flow of the gas was kept the same as the total amount of flow of the original mixed gas.

Comparative Example 3

This comparative example was the same as Example 1, except that the mixed gas of water vapor and carbon dioxide was replaced with carbon dioxide gas, and the amount of flow of the gas was kept the same as the total amount of flow of the original mixed gas.

Table 1 shows the performance parameters and electrochemical test results of the positive electrode materials prepared in the respective examples and comparative examples.

TABLE 1

|  | Compacted Powder Density (g/cm³) | Specific Surface Area (m²/g) | Initial Reversible Capacity (mAh/g) | Initial Coulombic Efficiency (%) | Capacity Retention Rate after 2,000 Cycles (%) |
| --- | --- | --- | --- | --- | --- |
| Example 1 | 2.23 | 11.87 | 155 | 98.2 | 92.2 |
| Example 2 | 2.31 | 12.21 | 154 | 97.8 | 91.5 |

TABLE 1-continued

|  | Compacted Powder Density (g/cm$^3$) | Specific Surface Area (m$^2$/g) | Initial Reversible Capacity (mAh/g) | Initial Coulombic Efficiency (%) | Capacity Retention Rate after 2,000 Cycles (%) |
| --- | --- | --- | --- | --- | --- |
| Example 3 | 2.28 | 12.33 | 156 | 98.5 | 91.8 |
| Example 4 | 2.25 | 11.56 | 152 | 97.7 | 92.1 |
| Example 5 | 2.23 | 11.89 | 155 | 97.5 | 91.3 |
| Example 6 | 2.25 | 12.11 | 150 | 97.2 | 90.5 |
| Example 7 | 2.22 | 12.15 | 151 | 97.1 | 91.8 |
| Example 8 | 2.32 | 11.85 | 154 | 97.3 | 92.2 |
| Comparative Example 1 | 2.15 | 12.05 | 148 | 96.3 | 87.6 |
| Comparative Example 2 | 2.27 | 10.85 | 139 | 95.2 | 77.6 |
| Comparative Example 3 | 2.11 | 11.85 | 143 | 96.7 | 85.5 |

It can be seen, from the data in the above table, that the recycled LFP positive electrode material prepared according to the method described in each of the examples exhibits more excellent electrochemical performance than the positive electrode materials prepared by the methods described in the comparative examples in terms of the initial reversible capacity, the initial coulombic efficiency, the cycle capacity retention rate, etc. This indicates that recycled LFP with better electrochemical performance can be prepared by the selective oxidation-reduction method proposed in the present disclosure. The initial reversible capacity is increased firstly due to removal, from waste lithium iron phosphate, of an excessive amount of electrochemically inactive carbon caused by the previous procedures such as homogenization. In the present disclosure, the amorphous coating carbon is removed therefrom by selective oxidation. On the one hand, the carbon content is reduced so that the proportion of electrochemically active LFP in the material is increased. On the other hand, coating carbon graphitized to a higher degree is not removed, whereby the conductivity of LFP can be significantly improved, and at the same time the growth of LFP crystal grains can be suppressed at a higher secondary sintering temperature. In this way, small crystal grains with higher crystallinity can be obtained, so that the material has a longer cycle performance.

It can be seen, from the comparison of Example 1, Comparative Example 1, and Comparative Example 2, that the use of a mixed gas of water vapor and carbon dioxide allows the obtained recycled LFP to have a strictly controlled $Fe^{3+}/Fe^{2+}$ (ratio) and thus exhibit better specific capacity and cycle performance.

The applicant declares that the detailed methods of the present disclosure are described by the foregoing embodiments in the present disclosure, but the present disclosure is not limited to the foregoing detailed methods. In other words, it is not intended that the implementation of the present disclosure must rely on the foregoing detailed methods. It should be understood by those skilled in the art that any modifications of the present disclosure, equivalent replacement of each of raw materials of the products of the present disclosure, addition of auxiliary ingredients, and selection of specific methods or the like should fall within the scope as claimed and disclosed in the present disclosure.

What is claimed is:

1. A method for recycling waste lithium iron phosphate by selective oxidation-reduction, comprising steps of:

performing primary sintering on the waste lithium iron phosphate under a condition where a mild oxidizing gas is introduced;

separating a lithium iron phosphate powder material from a material obtained by the primary sintering; and supplementing lithium and supplementing carbon to the lithium iron phosphate powder material and regulating a composition of the lithium iron phosphate powder material using a lithium source and a carbon source by secondary sintering, to obtain recycled lithium iron phosphate, wherein the mild oxidizing gas is a mixed gas of water vapor and $CO_2$ gas.

2. The method according to claim 1, having at least one of following situations (1) to (3):
(1) the mild oxidizing gas is a mixed gas of water vapor and $CO_2$ gas, and a flow rate ratio of the water vapor and the $CO_2$ gas is from 1:9 to 9:1;
(2) the water vapor is derived from at least one of deionized water and ultrapure water, and the water vapor has a resistance ≥18 MΩ; and
(3) the $CO_2$ gas has a purity ≥99.0%.

3. The method according to claim 1, having at least one of following situations (1) to (2):
(1) the waste lithium iron phosphate is derived from at least one of waste lithium iron phosphate battery electrode sheets and a waste lithium iron phosphate slurry; and
(2) the waste lithium iron phosphate battery electrode sheets comprise: waste LFP electrode sheets obtained by dismantling spent and decommissioned waste LFP batteries, waste LFP electrode sheets obtained by dismantling defective batteries scrapped from battery factories, and defective LFP electrode sheets scrapped from battery factories.

4. The method according to claim 1, having at least one of following situations (1) to (3):
(1) a mass ratio of the waste lithium iron phosphate to the mild oxidizing gas is from 1:0.1 to 1:10.0, and the mild oxidizing gas is introduced at a constant flow rate;
(2) a heating device used in a process of the primary sintering comprises one of a tube furnace, a box furnace, a roller kiln, and a rotary kiln; and
(3) in the primary sintering, a temperature is maintained at 300° C. to 700° C. for 0.5 hours to 15 hours.

5. The method according to claim 1, wherein the separating a lithium iron phosphate powder material from a material obtained by the primary sintering comprises: pulverizing and then separating the material obtained by the primary sintering.

6. The method according to claim 1, having at least one of following situations (1) to (2):
   (1) the lithium source used for the supplementing lithium comprises any one of $Li_2CO_3$, $LiOH \cdot H_2O$, $Li_3PO_4$, or $LiNO_3$, or a combination of at least two therefrom; and
   (2) the lithium source has a purity of an industrial grade or a battery grade.

7. The method according to claim 6, having at least one of following situations (1) to (3):
   (1) a method for the supplementing lithium comprises wet supplementation of lithium and dry supplementation of lithium;
   (2) $Li_2CO_3$ is used as the lithium source for the dry supplementation of lithium, and the $Li_2CO_3$ has a median particle diameter ranging from 0.2 μm to 10 μm; and
   (3) the lithium source is added in an amount calculated according to a molar ratio of Li:Fe, and an excess amount of Li ranges from 0.1% to 10.0%.

8. The method according to claim 1, wherein the carbon source comprises any one of glucose, sucrose, citric acid, acetylene black, polypropylene, or polyethylene glycol, or a combination of at least two therefrom.

9. The method according to claim 8, having at least one of following situations (1) to (3):
   (1) a method for the supplementing carbon comprises wet supplementation of carbon and dry supplementation of carbon;
   (2) the carbon source is added in an amount calculated such that resulting recycled lithium iron phosphate has a carbon content of 1.0 wt % to 6.0 wt %; and
   (3) a mixed carbon source of glucose and polyethylene glycol is used for the dry supplementation of carbon, and the mixed carbon source has a median particle diameter ranging from 0.2 μm to 10.0 μm; and in the mixed carbon source, glucose and polyethylene glycol are blended in a mass ratio ranging from 1:9 to 9:1.

10. The method according to claim 1, wherein the supplementing lithium and supplementing carbon to the lithium iron phosphate powder material and regulating a composition of the lithium iron phosphate powder material using a lithium source and a carbon source by secondary sintering, to obtain recycled lithium iron phosphate, comprises:
    mixing the lithium source and the carbon source with the lithium iron phosphate powder material and secondarily sintering the resulting mixture, to obtain the recycled lithium iron phosphate.

11. The method according to claim 10, having at least one of following situations (1) to (5):
    (1) the secondary sintering is performed under an inert gas, and the inert gas comprises any one of nitrogen, argon, helium, neon, krypton and xenon, or a combination of at least two therefrom;
    (2) a mass ratio of the lithium iron phosphate powder material to the inert gas is from 1:0.1 to 1:10.0;
    (3) during the secondary sintering, the inert gas is introduced at a constant flow rate;
    (4) in the secondary sintering, a temperature is maintained at 700° C. to 800° C. for 2 hours to 20 hours; and
    (5) a heating device used in the secondary sintering comprises any one of a tube furnace, a box furnace, a roller kiln and a rotary kiln.

12. The method according to claim 1, wherein after the recycled lithium iron phosphate is obtained, the method further comprises: sieving and demagnetizing the recycled lithium iron phosphate.

13. The method according to claim 1, comprising steps of:
    placing waste electrode sheets in a rotary kiln, into which the mixed gas of water vapor and carbon dioxide is introduced in a flow rate ratio of 4:6 to 6:4 and at a constant flow rate, increasing a temperature to 300° C. to 700° C. at a temperature increasing rate of 2° C./min to 5° C./min, maintaining the temperature for 0.5 hours to 15 hours, and cooling down the resultant along with the kiln;
    wherein a mass ratio of waste lithium iron phosphate to the mixed gas is from 1:0.1 to 1:10.0, with the waste lithium iron phosphate being an active ingredient in the waste electrode sheets;
    allowing electrode sheets after undergoing the primary sintering to be mechanically crushed and sieved through a screen with 10 to 400 meshes, and determining a content of Li, Fe, and C in a sieved out powder material by ICP and high-frequency infrared carbon and sulfur analysis;
    using $Li_2CO_3$ with a median particle diameter of 0.2 to 10 μm, and a mixed carbon source of glucose and polyethylene glycol in a mass ratio of 1:9 to 9:1, supplementing lithium to an excess amount of Li of 0.1% to 10.0% based on a molar ratio of Li:Fe, wherein an amount of the carbon source added is calculated such that resulting recycled lithium iron phosphate has a carbon content of 1.0 wt % to 6.0 wt %, mixing a mixture in a VC mixer for 0.1 to 8 hours, introducing nitrogen as a protective gas into a box furnace, secondarily sintering a mixture, and cooling down a resultant along with the furnace, to obtain the recycled lithium iron phosphate,
    wherein in the secondary sintering, a temperature is increased to 700° C. to 800° C. at a temperature increasing rate of 2° C./min to 5° C./min and maintained for 2 to 20 hours.

14. A recycled lithium iron phosphate, wherein the recycled lithium iron phosphate is prepared by the method according to claim 1.

15. The recycled lithium iron phosphate according to claim 14, having at least one of following situations (1) to (5):
    (1) a material of the recycled lithium iron phosphate has a median particle diameter of 0.1 μm to 10.0 μm;
    (2) the material of the recycled lithium iron phosphate has a specific surface area of 1.0 m$^2$/g to 20.0 m$^2$/g;
    (3) the material of the recycled lithium iron phosphate has a compacted powder density of 1.0 g/cm$^3$ to 2.8 g/cm$^3$;
    (4) the material of the recycled lithium iron phosphate has a pH of 6.0 to 12.0; and
    (5) the material of the recycled lithium iron phosphate has a carbon content of 1.0 wt % to 6.0 wt %.

16. A lithium ion battery, comprising the recycled lithium iron phosphate according to claim 14.

17. The method according to claim 5, wherein the material obtained by the primary sintering is mechanically pulverized and then sieved through a screen.

18. The method according to claim 5, wherein the material is pulverized at a median particle diameter ranging from 0.2 μm to 10.0 μm.

19. The method according to claim 5, wherein the screen has a number of meshes ranging from 10 meshes to 400 meshes.

20. The method according to claim 10, wherein a method for the mixing comprises mixing in a VC mixer, mixing in a single-cone drying mixer, or mixing in a double-cone drying mixer.

\* \* \* \* \*